No. 695,023. Patented Mar. 11, 1902.
S. C. ANDERSON.
CORN HARVESTER.
(Application filed May 4, 1901.)
(No Model.) 2 Sheets—Sheet 1.
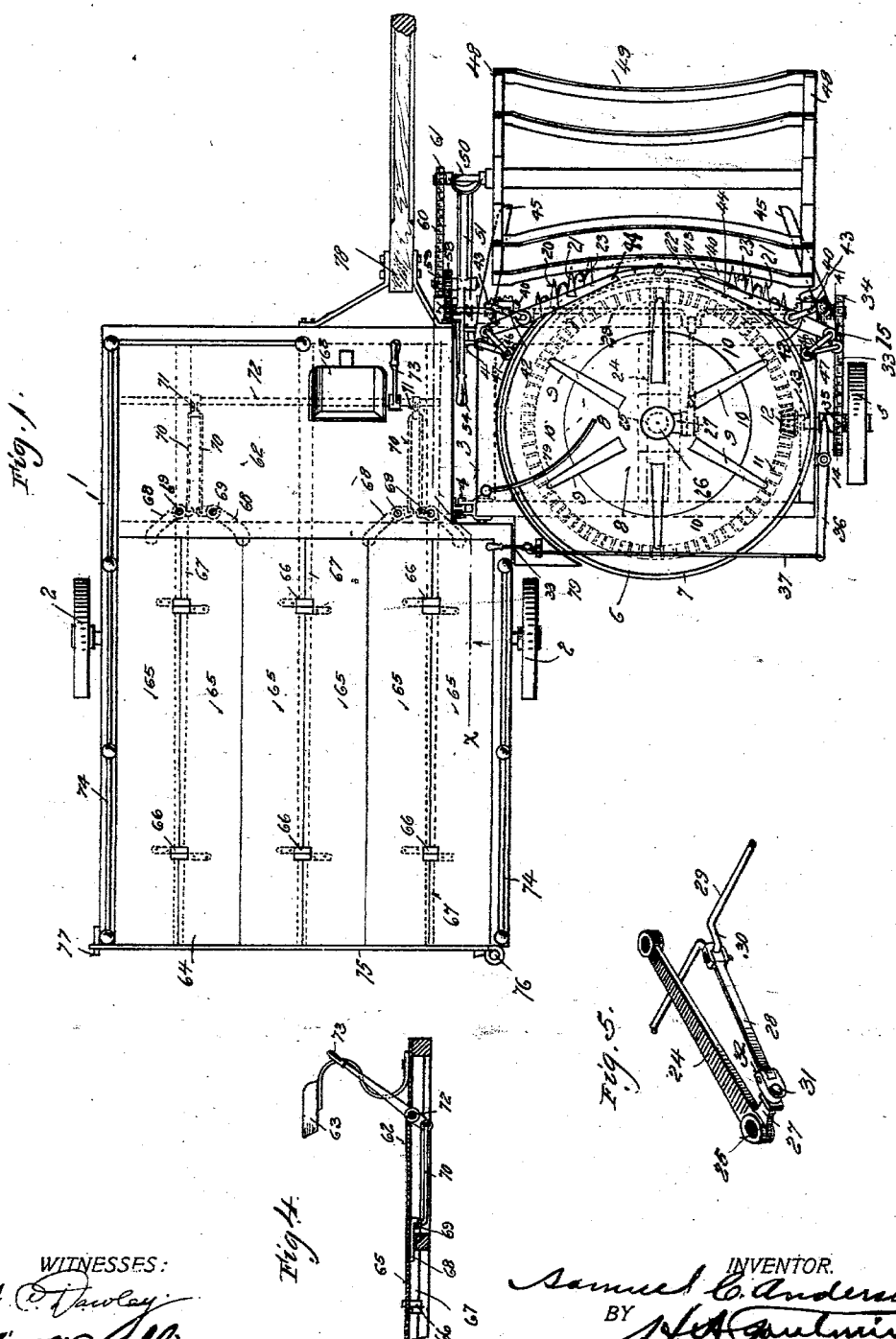
WITNESSES:
INVENTOR.
Samuel C. Anderson
BY
ATTORNEY.

No. 695,023. Patented Mar. 11, 1902.
S. C. ANDERSON.
CORN HARVESTER.
(Application filed May 4, 1901.)
(No Model.) 2 Sheets—Sheet 2.
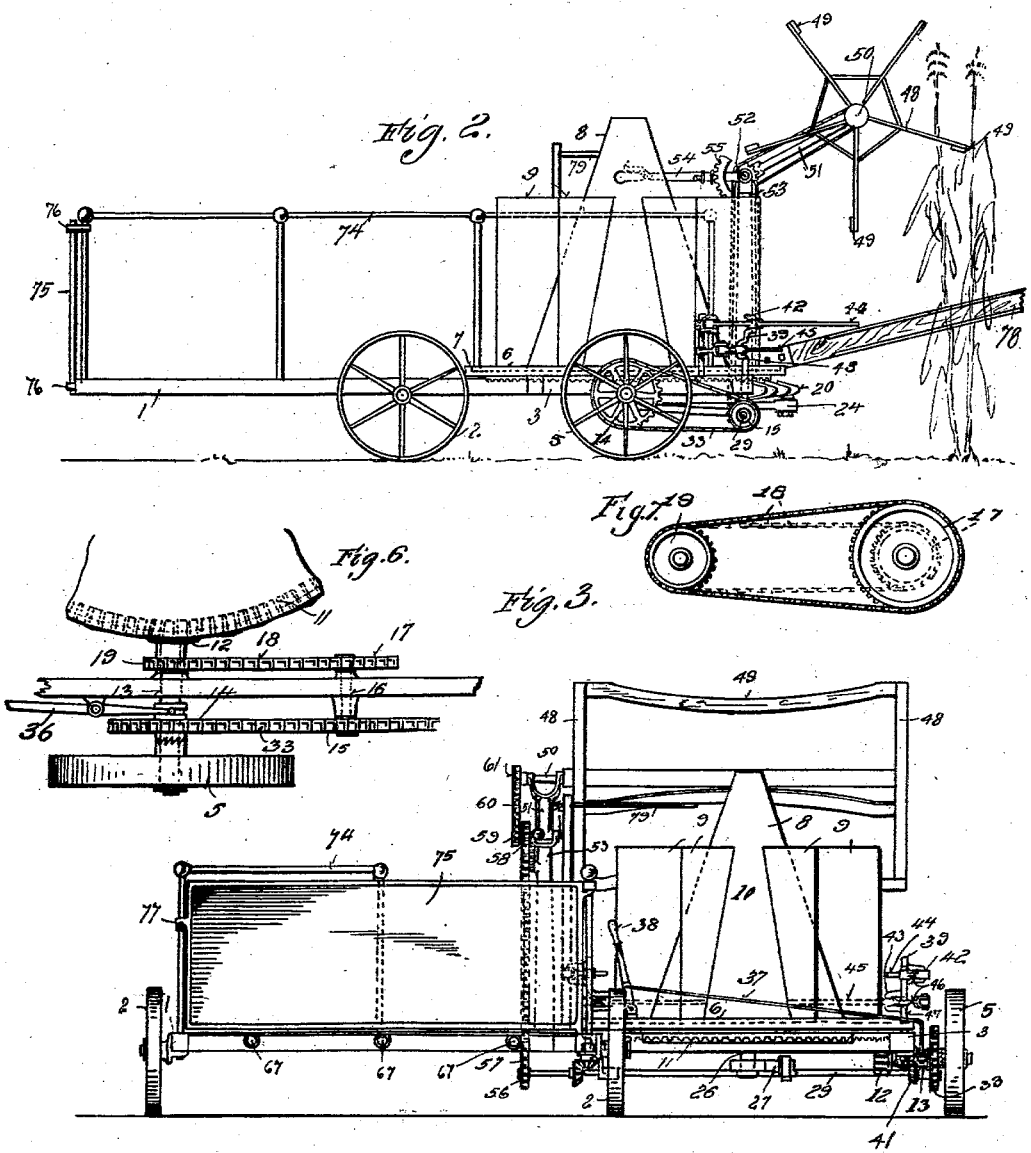
WITNESSES: INVENTOR.
Samuel C. Anderson
BY
ATTORNEY.

UNITED STATES PATENT OFFICE.

SAMUEL C. ANDERSON, OF XENIA, OHIO.

CORN-HARVESTER.

SPECIFICATION forming part of Letters Patent No. 695,023, dated March 11, 1902.

Application filed May 4, 1901. Serial No. 58,686. (No model.)

*To all whom it may concern:*

Be it known that I, SAMUEL C. ANDERSON, a citizen of the United States, residing at Xenia, in the county of Greene and State of Ohio, have invented certain new and useful Improvements in Corn-Harvesters, of which the following is a specification, reference being had therein to the accompanying drawings.

This invention relates to corn-harvesters, and has for its object to provide a mechanism whereby the corn may be cut and while sustained in a practically upright position be conveyed laterally from the cutter to a suitable platform, upon which it may be formed into a shock and deposited upon the ground.

To these ends my invention consists in certain novel features, which I will now proceed to describe and will then particularly point out in the claims.

In the accompanying drawings, Figure 1 is a plan view of an apparatus embodying my invention in one form. Fig. 2 is a side elevation. Fig. 3 is a rear elevation. Fig. 4 is a detail sectional view taken on the line $x\ x$ of Fig. 1. Fig. 5 is a detail perspective view of a portion of the mechanism for operating the cutter-bars. Fig. 6 is an enlarged detail plan view of the mechanism for driving the rotary platform, and Fig. 7 is a detail view of the same looking from the upper side of Fig. 6.

In the said drawings, 1 indicates the main frame of the machine supported upon wheels 2 and provided with the shocking-platform, hereinafter more particularly described. 3 indicates an auxiliary frame extending laterally from the front of the main frame and having a hinged connection therewith, as indicated at 4, said auxiliary frame being supported at one end by its hinged connection with the main frame, while at its other end it is supported by a wheel 5, which serves as a driving-wheel for the mechanism mounted on and supported by the auxiliary frame 3. This mechanism comprises a rotary platform 6, suitably mounted on the auxiliary frame 3, the body of said platform being horizontal and preferably circular in shape. The platform is provided at or near its margin with a flange or rib 7, extending upward therefrom a short distance, so as to prevent the butts of the stalks from slipping off, and from the central portion of said platform arises a conical support 8, decreasing in diameter toward its top and provided with radial wings 9, extending outward therefrom in vertical planes and forming between said wings, cone, and platform spaces 10 to receive the stalks. Motion is imparted to the platform 6 by means of a bevel-gear 11, secured on the under side of the platform and meshing with a pinion 12. This pinion is driven at a variable speed from the axle 13, on which the wheel 5 is mounted, and I have shown for this purpose a construction illustrated more in detail in Fig. 6 of the drawings, in which the pinion 12 is shown as mounted loosely on the end of the axle 13, said axle being provided with a sprocket-wheel 14, which drives a sprocket-wheel 15 on a counter-shaft 16. This counter-shaft is in turn provided with a sprocket-wheel 17, which by a chain 18 drives a sprocket-wheel 19, secured to the pinion 12 or to a sleeve on which said pinion is itself secured. The sprocket-wheel 17 is removable, and various sizes of sprocket-wheels may be substituted therefor in order to regulate the speed of revolution of the revolving platform 6.

At the end of the machine there is located a finger-bar 20, bent in an arc of a circle concentric with the rotary platform 6 and having located at each side of the front of said platform a group of fingers 21. In this curved finger-bar is located an oscillating or vibrating cutter-bar 22, provided with two groups of cutters 23, so located as to coöperate with the fingers 21. Motion is imparted to this cutter-bar by means of a vibrating arm 24, connected at its forward end to the cutter-bar and pivoted at its rear end, as indicated at 25, to the lower end of the shaft 26, on which the rotary platform 6 is mounted. The arm 24 is provided at its rear end with a right-angled projection or second arm 27, which is connected by means of a link 28 with an operating-shaft 29, located near the front of the machine on the auxiliary frame 3. As shown, the link 28 is pivoted at its front end to a crank 30 on the shaft 29, while its rear end is pivoted to a pin 31 on the arm or projection 27, the body of the link being provided with a knuckle-joint 32, as shown more particularly in Fig. 5 of the drawings. Rotary motion is imparted to the shaft 29 from the sprocket-wheel 14 by means of a sprocket-chain 33, which passes over the sprocket-wheel 14 on the axle 13 and over a sprocket-wheel 34 on the shaft 29. This same sprocket-chain 33 also drives the sprocket-wheel 15 on the counter-shaft 16, hereinbefore referred to.

In order to provide for stopping and starting the motion of the cutters and revolving platform, the sprocket-wheel 14 is mounted loosely on the axle 13 and may be connected with or disconnected from said axle by means of a clutch 35, splined on said axle and controlled by a lever 36, which is connected by means of a link or rod 37 with a hand-lever 38, located within convenient reach of the operator, who stands upon the shocking-platform.

In connection with the cutters and revolving platform I employ two sets of gathering-arms, one set for each cutter. Each set is operated by means of a vertical shaft 39, supported on the auxiliary frame 3, immediately adjacent to the coöperating cutter, and driven by means of a bevel-pinion 40 on its lower end meshing with a corresponding bevel-pinion 41 on the shaft 29. In the present instance each set of gathering-arms is shown as composed of two arms, and each vertical shaft 39 is provided with oppositely-arranged cranks 42 and 43, one of the gathering-arms, as 44, being mounted on the crank 42, while the other gathering-arm 45 is mounted on the crank 43. The forward end of each gathering-arm is free, while its rear end is connected by a pivoted link 46 with an upright or standard 47 on the auxiliary frame 3. It will be observed that by reason of this construction each arm is successively extended forward and then sweeps rearward and inward over the corresponding cutter-section, serving not only to draw the cornstalks toward the cutter, but also to carry the severed stalks from the cutter onto the revolving platform, where they will be deposited between the arms or wings 9 thereof in the particular space 10 which is at that time in the rear of the cutter-section. During this operation the other arm of this particular set is being withdrawn and again moved forward in order to engage with the next stalk or group of stalks and carry them in the same way to the cutter and thence to the revolving platform. It will be observed that this construction of cutters and gathering-arms is in duplicate on each side of the front of the revolving platform, so that the machine is thereby adapted to operate upon two rows of corn simultaneously.

In connection with the cutting and gathering arms just described I propose to employ a reel 48, the contact arms or bars 49 of which are curved, as shown, in order not only to push the corn toward the cutters and in reach of the gathering-arms, but also so as to gather the corn toward the revolving platform and the support thereon. This reel may be mounted and driven in any suitable manner, and in the present instance I have shown the reel-shaft 50 as mounted in an arm 51, pivoted at 52 on a standard 53 and provided with an adjusting-lever 54, having the usual locking-quadrant 55, so that the reel may be raised and lowered, as desired. The reel is driven from the shaft 29 by means of a sprocket-wheel 56 on the inner end of said shaft, from which a sprocket-chain 57 passes over a second sprocket-wheel 58, having its axis in line with the pivot 52 and connected with a second sprocket-wheel 59 on the same axis, which by means of a sprocket-chain 60 and sprocket-wheel 61 on the reel-shaft 50 imparts motion to the reel in whatever position it may be adjusted.

The shocking-platform, which is supported on the main frame 1, comprises a forward fixed portion 62, upon which the operator may stand and which may have mounted thereon the driver's seat 63 and a rear dumping portion 64. This rear portion is composed of tilting sections 65, which are pivoted in pairs, as indicated at 66, to longitudinally-extending shafts 67, secured to the forward section 62 and extending rearward therefrom. When these tilting sections are raised to a horizontal position, they form a continuous platform and are supported in this position by arms or fingers 68, pivoted at 69 on the under side of the fixed section 62 of the platform and connected by links 70 with arms 71 on a rock-shaft 72, which is adapted to be operated by a hand-lever 73, located within convenient reach of the driver. It will be observed that the rear ends of the arms or fingers 68 extend under the forward edges of the tilting sections 65, so as to support them in a horizontal position, these ends being capable of being drawn forward by a rearward movement of the hand-lever 73, so as to disengage them from the tilting sections and permit these latter to drop into a vertical position. The shocking-platform is surrounded by a guard or railing 74, except at that point where the auxiliary frame 3 is connected with the main frame 1. The rear portion of this frame is in the form of a gate 75, hinged at one end at 76 to one side of the railing 74, its other end being held closed by means of a latch 77, which may be disengaged, so as to permit it to be swung open into the line of draft, and thus leave the rear of the shocking-platform unobstructed.

The apparatus is propelled by means of horses, which may be hitched to a tongue 78, connected to the front of the main frame 1, so that the horses will travel at one side of the rows of corn to be cut.

The operation of the apparatus is as follows: As the machine is drawn along the reel engages with the tops of the stalks and draws them toward the vibrating arms and cutters, and the vibrating arms serve to positively present the lower portions of the stalks to the cutters, by means of which they are severed. These arms, in conjunction with the reel, carry the severed stalks rearward in an upright position and deposit them on the rotating platform, where they are held in said upright position against the cone 8 by the arms or wings 9. The revolving platform serves as a conveyer, by means of which the upright stalks are carried laterally toward the dumping-platform, and when they reach the proper point they are lifted by an attendant from the revolving platform and placed upon the rear or tilting section of the shocking-platform. When sufficient corn has accumulated upon the shocking-platform, it is bound into a shock, in the usual manner, with twine, the gate at the end of said platform is opened, and the lever 73 is operated to permit the tilting sections to drop into a vertical position, thus depositing the shock upon the ground. The machine is then moved forward, leaving the standing shocks upon the ground, the tilting sections are replaced in position, and the apparatus is ready to proceed with its operations as before.

It will be observed that the hinged or flexible connection between the two sections of the frame of the apparatus permits it to adapt itself to the inequalities of the surface of the soil without interfering with the operation of the machine.

In case the speed of the revolving platform is too great, it can be regulated in the manner hereinbefore described by making a suitable change in the size of the sprocket-wheel 17 on the counter-shaft 16. In case the corn accumulates on the conveying-platform more rapidly than it is removed, I provide at the rear of the space between the said conveyer and the shocking-platform two stationary curved arms 79, in which the surplus corn is deposited, so as to permit the platform to continue in operation without becoming clogged or overloaded.

It will be observed that the shock is deposited in such a position that at the next passage of the machine there is room for the team and the main frame of the machine to pass between the shocks and the standing corn.

It is obvious that the details of construction hereinbefore described, and shown in the drawings, may be modified without departing from the principle of my invention, and I therefore do not wish to be understood as limiting myself to the precise construction hereinbefore specified.

Having thus fully described my invention, what I claim as new, and desire to secure by Letters Patent, is—

1. A corn-harvester comprising a cutting mechanism, a rotary platform located in the rear of the cutting mechanism and serving to convey the severed stalks rearwardly and laterally therefrom, and a shocking-platform located at the side of the rotary platform and adapted to receive the stalks to form a shock thereon, substantially as described.

2. A corn-harvester comprising a cutting mechanism, a rotary platform located in the rear of said cutting mechanism and adapted to convey the severed stalks rearwardly and laterally therefrom, and a shocking-platform located at the side of the rotary platform and comprising a dumping portion composed of tilting sections upon which the shock is formed and from which it may be discharged by tilting said sections, substantially as described.

3. A corn-harvester comprising a cutting mechanism, a rotary platform located in the rear of said cutting mechanism and adapted to convey the severed stalks rearwardly and laterally therefrom, and a shocking-platform located at the side of said rotary platform and comprising a fixed forward portion and a rear dumping portion composed of tilting sections, substantially as described.

4. A corn-harvester comprising a cutting mechanism, a lateral shocking-platform and a rotary conveying-platform located in the rear of the cutting mechanism and at the side of the shocking-platform and comprising a horizontal body and a tapering upright support with radial wings or arms, substantially as described.

5. In a corn-harvester, the combination, with a cutting mechanism, of a rotary platform located in the rear of said cutting mechanism, a ground-wheel operatively connected with said rotary platform to actuate the same, and means for varying the speed of rotation of the platform relatively to that of the ground-wheel, substantially as described.

6. In a corn-harvester, the combination, with a rotary conveying-platform, of two cutting mechanisms located in front of said platform at opposite sides thereof to operate simultaneously on two rows of corn, and a shocking-platform located laterally relatively to said rotary platform, whereby the severed stalks of both rows are delivered to said shocking-platform by said rotary platform, substantially as described.

7. In a corn-harvester, the combination, with a rotary conveying-platform of circular form, of a correspondingly-curved finger-bar located at the front of said platform and having guard-fingers at each of its ends, and a cutter-bar of similarly-curved form having a group of cutters at each end coöperating with the guard-fingers, and means for oscillating or vibrating said cutter-bar, substantially as described.

8. In a corn-harvester, the combination, with a shocking-platform located at the side of the machine, of a rotary conveying-platform, cutting mechanisms located at each side of said platform in front of the same, gathering-arms arranged in sets above each cutting mechanism to draw the stalks toward the cutting mechanisms and platform, and means for actuating said gathering-arms, the rotary platform serving to convey the severed stalks rearwardly and laterally from the cutting mechanism to the shocking-platform, substantially as described.

9. In a corn-harvester, the combination, with a shocking-platform located at the side of the machine, of a rotary conveying-platform, a cutting mechanism located in front of the same, and gathering mechanism comprising an upright shaft provided with oppositely-arranged cranks, gathering-arms pivotally mounted on said cranks, and links pivoted at one end to the rear end of said arms and at the other end to a fixed support, the rotary platform serving to convey the severed stalks rearwardly and laterally from the cutting mechanism to the shocking-platform, substantially as described.

10. In a corn-harvester, the combination, with a shocking-platform located at the side of the machine, of a rotary conveying-platform, cutting mechanism located in advance of the same, gathering-arms located above said cutting mechanism and adapted to act upon the lower parts of the stalks to draw them toward the cutting mechanism and platform, and a reel located above said gathering-arms and adapted to act upon the upper portions of the stalks to move them toward the cutting mechanism and platform, the rotary platform serving to convey the severed stalks rearwardly and laterally from the cutting mechanism to the shocking-platform, substantially as described.

11. In a corn-harvester, the combination, with a rotary conveying-platform and cutting mechanism located in advance of the same, of a reel having bowed or curved arms to move the upper portions of the stalks rearward and at the same time gather them inward toward the cutting mechanism and platform, substantially as described.

12. A corn-harvester comprising a cutting mechanism, a rotary conveying-platform located in the rear of the cutting mechanism, a shocking-platform located at one side of said rotary conveying-platform, and fixed curved arms located at the rear of the junction of the conveying and shocking platforms to receive the surplus stalks, substantially as described.

In testimony whereof I affix my signature in presence of two witnesses.

SAMUEL C. ANDERSON.

Witnesses:
 W. F. TRADER,
 A. C. ANDERSON.